United States Patent
Suemoto et al.

(10) Patent No.: US 9,476,130 B2
(45) Date of Patent: Oct. 25, 2016

(54) ELECTROLYTIC CELL

(75) Inventors: Hiroki Suemoto, Shunan (JP); Fumio Sadahiro, Shunan (JP); Tsuyoshi Nomura, Shunan (JP); Kenji Sakamoto, Shunan (JP); Yoshiyuki Kodama, Tamano (JP)

(73) Assignees: TOSOH CORPORATION, Shunan-shi (JP); CHLORINE ENGINEERS CORP., LTD., Tokyo (JP)

( * ) Notice: Subject to any disclaimer, the term of this patent is extended or adjusted under 35 U.S.C. 154(b) by 0 days.

(21) Appl. No.: 13/977,301

(22) PCT Filed: Dec. 27, 2011

(86) PCT No.: PCT/JP2011/080295
§ 371 (c)(1),
(2), (4) Date: Aug. 2, 2013

(87) PCT Pub. No.: WO2012/091051
PCT Pub. Date: Jul. 5, 2012

(65) Prior Publication Data
US 2013/0299342 A1 Nov. 14, 2013

(30) Foreign Application Priority Data

Dec. 28, 2010 (JP) ................... 2010-292307

(51) Int. Cl.
*C25B 9/08* (2006.01)
*C25B 1/26* (2006.01)
(Continued)

(52) U.S. Cl.
CPC . *C25B 9/08* (2013.01); *C25B 1/26* (2013.01); *C25B 9/04* (2013.01); *C25B 11/03* (2013.01); *Y02P 20/126* (2015.11); *Y02P 20/20* (2015.11)

(58) Field of Classification Search
CPC ............. C25B 1/16; C25B 1/26; C25B 1/34; C25B 1/46; C25B 13/00; C25B 13/02; C25B 9/08
USPC .............................. 204/297.14; 205/516–537
See application file for complete search history.

(56) References Cited

U.S. PATENT DOCUMENTS

| 4,340,452 A | 7/1982 | deNora |
| 4,343,690 A | 8/1982 | de Nora |

(Continued)

FOREIGN PATENT DOCUMENTS

| JP | 63-53272 B2 | 10/1988 |
| JP | 05-009774 A | 1/1993 |

(Continued)

OTHER PUBLICATIONS

International Search Report for PCT/JP2011/080295, mailing date of Apr. 17, 2012.

*Primary Examiner* — Ciel Thomas
(74) *Attorney, Agent, or Firm* — Westerman, Hattori, Daniels & Adrian, LLP (57) ABSTRACT

An ion-exchange membrane method electrolytic cell comprising a coil cushion arranged between a conductive plate and a cathode in a cathode chamber, and further an ion-exchange membrane arranged in contact with the cathode. The conductive plate is not perforated, and the coil cushion is arranged so that its axial direction is in agreement with the vertical direction of electrolytic cell. Preferably the coil cushion is made of a metal coil and has an impact resilience of 7-17 kPa. The cathode preferably has supported electrode catalyst and is made of an expanded metal with strands of 0.1-1.0 mm width and 0.1-1.0 mm thickness, and having SW of 0.5-5.0 mm and LW of 1.0-10 mm, and 48-60% open area. The electrolytic cell is energy-saving, and damage thereof can be avoided over a long period, and elevation of voltage and reduction of current efficiency with time can be minimized.

5 Claims, 3 Drawing Sheets

(51) Int. Cl.
*C25B 9/04* (2006.01)
*C25B 11/03* (2006.01)

(56) References Cited

U.S. PATENT DOCUMENTS

| | | |
|---|---|---|
| 4,381,979 A | 5/1983 | De Nora et al. |
| 4,444,632 A | 4/1984 | deNora |
| 4,468,311 A | 8/1984 | de Nora et al. |
| 4,530,743 A | 7/1985 | deNora |
| 4,615,775 A | 10/1986 | de Nora et al. |
| 4,693,797 A * | 9/1987 | deNora .................... C25B 1/46 204/252 |
| 4,792,388 A | 12/1988 | de Nora |
| 5,314,591 A | 5/1994 | Katayama et al. |
| 5,360,626 A | 11/1994 | Iyengar et al. |
| 6,042,702 A * | 3/2000 | Kolouch et al. ............. 204/252 |
| 2004/0188245 A1 | 9/2004 | Katayama et al. |
| 2005/0130007 A1* | 6/2005 | Cisar et al. .................... 429/32 |
| 2006/0042935 A1 | 3/2006 | Houda et al. |
| 2007/0278095 A1 | 12/2007 | Asaumi |
| 2008/0029396 A1 | 2/2008 | Shirakura et al. |
| 2009/0071820 A1 | 3/2009 | Saiki et al. |

FOREIGN PATENT DOCUMENTS

| | | |
|---|---|---|
| JP | 05-306484 A | 11/1993 |
| JP | 2000-178781 A | 6/2000 |
| JP | 2001-064792 A | 3/2001 |
| JP | 2004-300547 A | 10/2004 |
| JP | 2005-330575 A | 12/2005 |
| JP | 2006-322018 A | 11/2006 |
| JP | 2007-321229 A | 12/2007 |
| JP | 2009-120882 A | 6/2009 |
| JP | 4453973 B2 | 4/2010 |
| WO | 2004/048643 A1 | 6/2004 |
| WO | 2010/119918 A1 | 10/2010 |

* cited by examiner

ELECTROLYTIC CELL

TECHNICAL FIELD

This invention relates to a novel zero gap-type ion exchange membrane method electrolytic cell having a cell structure wherein an anode, an ion exchange membrane and a cathode are arranged in close contact with each other, which is used in electrolysis industry typically including electrolysis of alkali chloride.

The ion exchange membrane method electrolytic cell of the present invention has a structure such that a coil cushion is arranged as a cushion arranged between a rib and a cathode within a cathode chamber instead of the spring retaining member as used in the conventional electrolytic cell. By using the coil cushion, the cathode of a mesh form and the ion exchange membrane can be placed in more close contact with each other, and enhanced voltage reducing effect can be exhibited.

BACKGROUND ART

The ion exchange membrane method electrolysis industry represented by the alkali chloride electrolysis plays an important role as a primary material industry. In this electrolysis industry, the ion exchange membrane method electrolytic cell (hereinafter referred to as "electrolytic cell" when appropriate) forms a technical core.

For example, a co-applicant of the present invention has provided an electrolytic cell in patent document 1 wherein a corrugated partition at the anode side and a corrugated partition at the cathode side, which are capable of being fitted with each other to form superposed corrugated partition layers having a ridge-and-groove configuration, and electrode plates are fitted onto the ridge portions of the partition layers; and the groove portions extend vertically not in one long straight line, and each groove portion is placed in contact with the adjacent groove portions in a liquid mixing region. In this electrolytic cell, liquid electrolyte flows upwardly due to the action of electrolyte bubbles generated by electrolysis while the liquid electrolyte is mixed in the liquid mixing regions, whereby the distribution of concentration of liquid electrolyte becomes uniform and thus the electrolysis operation can be stably continued over a long period of time.

In another electrolyte cell, proposed in, for example, patent document 2, a cathode is placed in contact with an ion exchange membrane by comb-like leaf spring members whereby damage of the ion exchange membrane can be avoided As a modification of the ion exchange membrane method electrolytic cell, an electrolyte cell is proposed in, for example, patent document 3, which has a structure such that leaf spring members are supported by a leaf-spring retaining member whereby the stress applied between the electrode and the ion exchange membrane are rendered small and consequently damage of the ion exchange membrane is minimized.

The above-mentioned modified ion exchange membrane method electrolytic cell has a problem such that the leaf spring-retaining member is apt to be distorted in operation by the pressure whereby the ion exchange membrane is occasionally spaced away from the cathode which leads to increase in the electrolysis voltage. When the electrolytic cell apparatus is disassembled and again assembled, height of the leaf spring-retaining member must be adjusted.

Therefore, an improved ion exchange membrane method electrolytic cell is desired wherein another flexible cushion is interposed between the cathode and the ion exchange membrane to minimize the damage of the ion exchange membrane and the deformation of the cushion due to the stress by the pressure.

Zero gap-type ion exchange membrane method electrolytic cells have been proposed in, for example, patent documents 4 to 6 wherein a cushion matt is placed between an electrically conductive plate and an electrode. In these proposed electrolytic cells, the electrically conductive plate is made of a rigid mesh screen, i.e., a perforated plate.

As seen from the above explanation, in the conventional ion exchange membrane method electrolytic cells wherein the electrically conductive plate is spaced apart from the partition at a predetermined distance and a cushion mat is arranged between the electrically conductive plate and the electrode, it is usual that the electrically conductive plate is made of a perforated plate and gas generated on the electrode is withdrawn through openings of the perforated plate to the partition side.

PRIOR ART DOCUMENTS

Patent Documents

Patent document 1: JP H5-009774 A
Patent document 2: JP H5-306484 A
Patent document 3: JP 2007-321229 A
Patent document 4: JP S63-53272 A
Patent document 5: JP Patent 4453973 A
Patent document 6: JP 2000-178781 A

SUMMARY OF THE INVENTION

Problems to be Solved by the Invention

The present inventors have made extensive research to develop an improved ion exchange membrane method electrolytic cell, and found that, an ion exchange membrane method electrolytic cell having a cell structure such that a non-perforated electrical conductive plate is used instead of a perforated electrically conductive plate has surprising benefits such that elevation of voltage with time and reduction of current efficiency with time can be minimized. These benefits are not achieved by the conventional zero gap-type ion exchange membrane method electrolytic cell having a structure such that a cushion mat is arranged between a perforated electrical conductive plate and an electrode. Based on the above-mentioned findings, the present invention has been completed.

By adopting a non-perforated electrically conductive plate, gas generated on the electrode rises up between the non-perforated plate and the electrode. This forms a violently rising stream of gas and concurrently therewith a violent downward stream of electrolyte liquid between the electrically conductive plate and the partition. It is presumed that these violently rising stream and violent downward stream promote supply of electrolyte liquid onto the ion exchange membrane and leads to minimization in elevation of voltage with time and reduction of current efficiency with time.

In view of the foregoing, an object of the present invention is to provide an ion exchange membrane method electrolytic cell having a new structure which achieves benefits such that loss of electrical energy can be minimized as much as possible, breakage of a ion-exchange membrane can be prevented over a long period, and elevation of voltage with time and reduction of current efficiency with time can be minimized.

Means for Solving the Problems

The present invention provides an ion exchange membrane method electrolytic cell comprising a coil cushion arranged between an electrically conductive plate and a cathode, which are accommodated in a cathode chamber, and further comprising an ion-exchange membrane in contact with which the cathode is arranged, characterized in that the electrically conductive plate is made of a non-perforated plate, and the coil cushion is arranged so that the axial direction thereof is in agreement with the vertical direction of the ion exchange membrane method electrolytic cell.

Effect of the Invention

Figure 1:
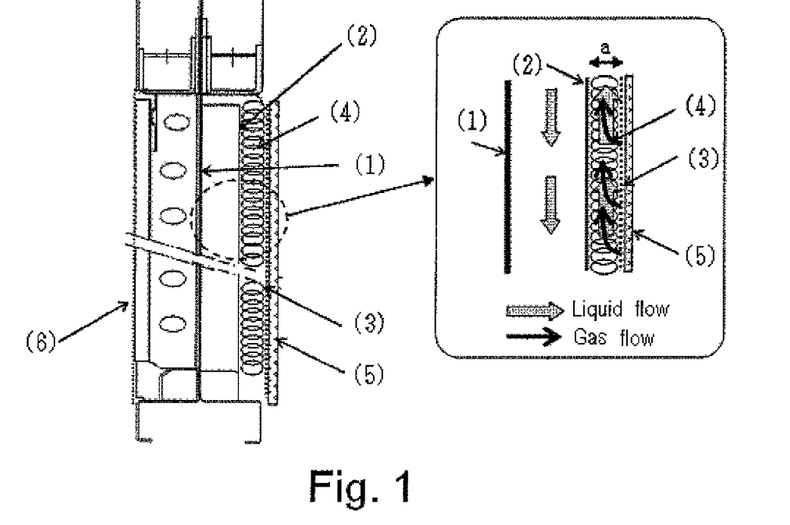
FIG. 1 is a partially enlarged cross-section illustrating an improved cell structure of an ion exchanged membrane method electrolytic cell of the present invention.

As illustrated in FIG. 1, the ion exchange membrane method electrolytic cell of the present invention has a cell structure such that a coil cushion (4) is arranged between an electrical conductive plate (2) and a cathode (3). By the coil cushion (4), the electrical energy consumption can be reduced. Further, the impact resilience of the coil cushion (4) can be easily adjusted so as to obtain a contact pressure of the desired extent, therefore, a uniform contact pressure is applied from via the coil cushion (4) between the cathode (3) and the ion exchange membrane (5). Thus, breakage of the ion-exchange membrane (5) occurring due to an excessive contact pressure can be prevented over a long period.

The electrical conductive plate (2) as used in the electrolytic cell of the present invention is made of a non-perforated plate, gas generated from the cathode (3) forms a stream violently rising along the coil cushion (4). The stream of gas is accompanied by liquid electrolyte, therefore, the liquid electrolyte also violently rises. Simultaneously the liquid electrolyte forms a stream violently flowing down between the non-perforated electrically conductive plate (2) and the partition (1). Consequently supply of liquid electrolyte to the ion exchange membrane (5) is enhanced, and the concentration of the liquid electrolyte is not reduced, and elevation of electrolysis voltage with time and reduction of current efficiency with time can be minimized.

EXPLANATION OF REFERENCE NUMERALS

1: Partition
2: Electrically conductive plate (non-perforated plate)
3: Cathode
4: Coil cushion
5: Ion exchange membrane
6: Anode
7: Metal frame
8: Metal coil
9: Electrically conductive plate (perforated plate)

MODES FOR CARRYING OUT THE INVENTION

Modes for carrying out the present invention will now be described in detail by reference to the drawings.

The embodiments described in the following are drawn to ion exchange membrane method electrolytic cells used for electrolysis of sodium chloride. However, the ion exchange membrane method electrolytic cells of the present invention can also be applied for other electrolysis such as, for example, electrolysis of aqueous potassium chloride solution, or electrolysis of aqueous alkaline solution.

FIG. 1 illustrates a cathode side and anode side of the cell structure of the ion exchange membrane method electrolytic cell of the present invention. The cell structure is divided by the partition (1) to form a cathode chamber and an anode chamber.

The anode chamber may have the same constitution as that of a conventional ion exchanged membrane method electrolytic cell. In contrast, the cathode chamber has a modified constitution as described below.

In the cathode chamber, a coil cushion (4) is arranged between an electrically conductive plate (2) and a cathode (3), and the cathode (3) is arranged in contact with an ion-exchange membrane. An anode (6) is fitted to one side of the anode chamber. The anode (6) is arranged in a manner such that it is in contact with a cathode (3) via an ion exchange membrane (5) of the adjacent electrolytic cell unit (this arrangement is not shown in FIG. 1).

The ion exchange membrane method electrolytic cell of the present invention will be described in more detail.

As illustrated in FIG. 1, a coil cushion (4) is arranged so that the axial direction thereof is in agreement with the vertical direction of the ion exchange membrane method electrolytic cell. Further, an electrically conductive plate (2) made of a non-perforated plate is arranged.

By adopting the non-perforated electrically conductive plate (2), as illustrated in the partially enlarged cross-sectional view of FIG. 1, gas generated on the cathode (3) does not leak to the outside through the non-perforated electrically conductive plate (2), but rises up and forms a violently rising stream of gas flowing along the coil cushion (4). The stream of gas is accompanied by an electrolyte, thus forms a violently rising stream of the electrolyte. Concurrently therewith a violent downward stream of the electrolyte is formed between the electrically conductive plate (2) and the partition (1).

Consequently these violently rising stream and violent downward stream promote supply of an electrolyte onto the ion exchange membrane, and do not reduce the concentration of the electrolyte and achieve minimization in elevation of voltage with time and reduction of current efficiency with time.

Figure 2:
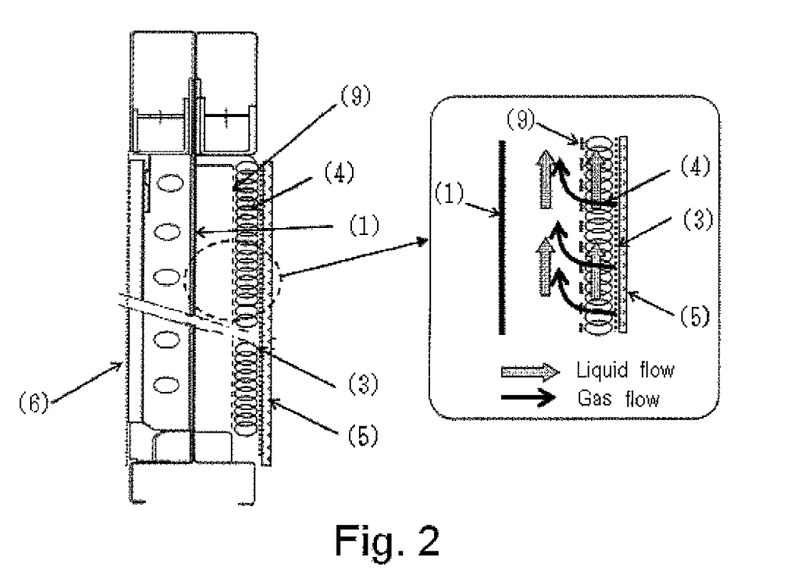
FIG. 2 is a partially enlarged cross-section illustrating a cell structure of an ion exchanged membrane method electrolytic cell having a perforated electrically conductive plate.

For comparison, a cell structure of an ion exchanged membrane method electrolytic cell having a perforated electrically conductive plate (9) is illustrated in FIG. 2.

As illustrated in the partially enlarged cross-sectional view of FIG. 2, hydrogen gas generated from the cathode (3) passes through the perforated electrically conductive plate (9) to the backside of the plate (9). Thus, violently rising stream of gas and the accompanying violently rising stream of an electrolyte are not formed. A downward stream of an electrolyte is also not formed (this is in contrast with the ion exchange membrane method electrolytic cell of the present invention wherein a downward stream of electrolyte is formed between the non-perforated electrically conductive plate (2) and the partition (1) as illustrated in FIG. 1). Consequently, it is presumed that supply of the electrolyte to the ion exchange membrane (5) is insufficient, and the concentration of the electrolyte is reduced, and elevation of voltage with time and reduction of current efficiency with time occur.

Figure 3:
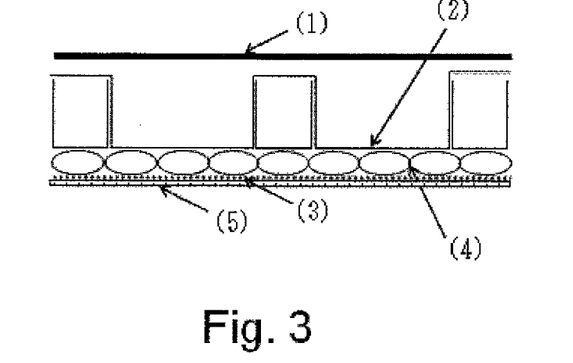
FIG. 3 is a top plan view illustrating the ion exchanged membrane method electrolytic cell of the present invention shown in FIG. 1.

A top plan view illustrating the ion exchange membrane method electrolytic cell of the present invention is shown in FIG. 3, wherein the coil cushion (4) is arranged so that the axial direction thereof is in agreement with the vertical direction of the electrolytic cell.

Hydrogen gas generated on the cathode (3) is upwardly flown smoothly, and, in accompanied therewith, the flow of the electrolyte promotes supply of the electrolyte to the ion exchange membrane. Consequently the concentration of the electrolyte is not reduced, and elevation of electrolysis voltage with time and reduction of current efficiency with time can be minimized.

Figure 4:
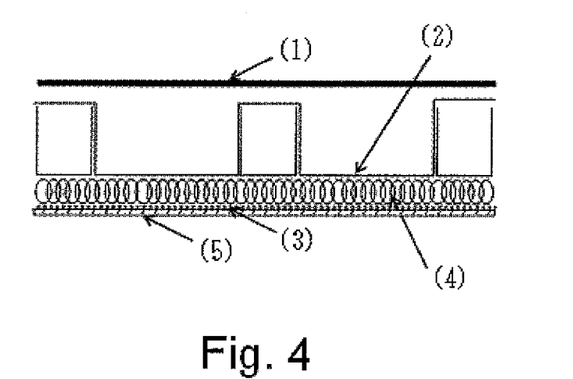
FIG. 4 is a top plan view illustrating an ion exchanged membrane method electrolytic cell shown in FIG. 6 of JP 2004-300547 A.

For comparison, a top plan view illustrating the conventional ion exchange membrane method electrolytic cell is shown in FIG. 4, wherein the coil cushion (4) is arranged so that the axial direction thereof is in agreement with the transverse direction of the electrolytic cell, not with the axial direction thereof (which is shown, for example, in FIG. 6 of JP 2004-300547 A).

Hydrogen gas generated on the cathode (3) tends to be flown transversely and stagnant, and, in accompanied therewith, the flow of an electrolyte is apt to be disturbed and the supply of the electrolyte to the ion exchange membrane is insufficient. Consequently, the concentration of the electrolyte is reduced, and elevation of electrolysis voltage with time and reduction of current efficiency with time occur.

Figure 5:
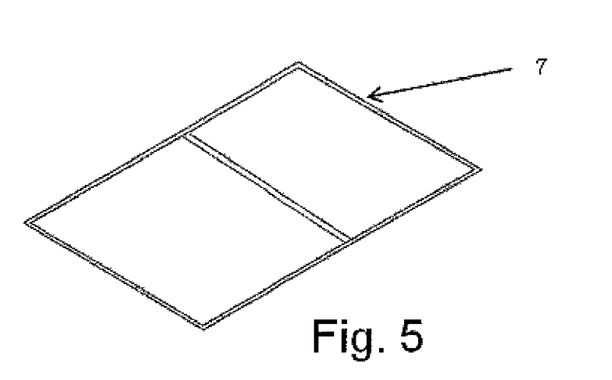
FIG. 5 is a perspective view illustrating an example of a metal frame used for making a coil cushion.
Figure 6:
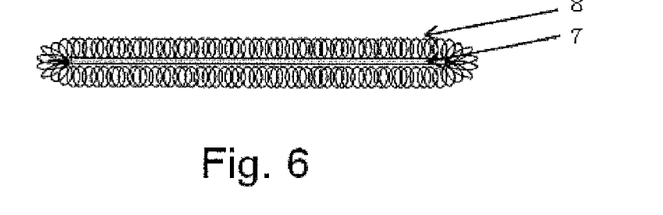
FIG. 6 is a view illustrating an example of a metal coil constituting the coil cushion.
Figure 7:
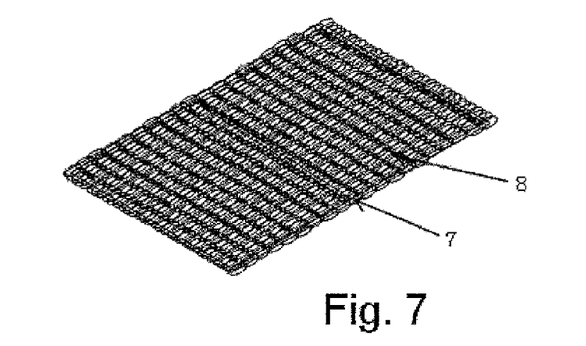
FIG. 7 is a perspective view illustrating an example of a coil cushion.

The coil cushion (4) arranged between the electrically conductive plate (2) and the cathode (3) in the cathode chamber is preferably comprised of a metal coil (8) as shown in FIG. 6 which is wound around a metal frame (7) as shown in FIG. 5, and preferably has a constitution as illustrated in FIG. 7. The coil cushion (4) having such constitution can be easily and surely arranged.

The metal frame (7) is preferably comprised of an anticorrosive metal such as, for example, nickel or stainless steel. The metal frame (7) is made of a rod with a diameter in the range of preferably 1 to 3 mm, and more preferably 1 to 2 mm. With a rod diameter smaller than 1 mm, the metal frame has a small tenacity and poor handling characteristics. In contrast, with a rod diameter larger than 3 mm, the metal frame is costly and the metal frame is pressed strongly against the ion exchange membrane (5) and the cathode (3) which occasionally leads to breakage of the ion exchange membrane (5) and the cathode (3).

The coil cushion (4) is comprised of metal coil (8) wound around the metal frame (7) at a winding number preferably in the range of 3 to 9 times per cm, and more preferably 6 to 7 times per cm. If the winding number is too small, the impact resilience is poor, and, when the coil cushion is pressed, the resilience of the coil cushion becomes poor. In contrast, if the winding number is too large, the impact resilience tends to become excessive and the handling characteristics become occasionally poor.

The metal coil (8) is preferably comprised of an anticorrosive and electrically highly conductive metal such as, for example, nickel or stainless steel. Another preferable example of the metal coil (8) is comprised of a metal coil of an electrically highly conductive metal such as copper, which is coated with an anticorrosive nickel.

The method of making metal coil (8) is not particularly limited, but can be made by a roll forming of a wire rod of, for example, nickel or stainless steel, to be thereby shaped into a coil form. The wire rod preferably has a diameter of 0.1 to 2.0 mm, and more preferably 0.1 to 1 mm. With a wire rod having a too small diameter, the metal coil has a small tenacity and is subject to plastic deformation at use and exhibits poor impact resilience. In contrast, with a wire rod diameter having a too large diameter, and the roll-forming thereof becomes difficult to form, or, even when the roll forming is possible, the impact resilience becomes excessive and the desired coil cushion (4) is difficult to obtain.

Ring diameter of the metal coil (8), i.e., apparent coil diameter, is not particularly limited, but is usually in the range of 3 to 10 mm. With a ring diameter of smaller than 3 mm, the compression in thickness of the cushion is insufficient and the benefit of the present invention is occasionally difficult to obtain. In contrast, with a ring diameter of larger than 10 mm, the handling characteristics are occasionally poor and, when the cushion is compressed, it subjects to plastic deformation and the impact resilience is often insufficient.

The coil thickness of the metal coil (8) refers to the length expressed by the arrow of both directions "↔" shown by "a" in FIG. 1. The coil thickness is not particularly limited, and is usually in the range of 1 to 10 mm, preferably 1 to 4 mm. If the coil thickness is too large, the impact resilience upon compression is insufficient and the benefit of the present invention is occasionally difficult to obtain. In contrast, if the coil thickness is too small, the impact resilience upon compression sometimes becomes excessively high and the ion exchange membrane is sometimes damaged.

The method for arranging the coil cushion (4) between the electrically conductive plate (2) and the cathode (3) is not particularly limited provided that the coil cushion (4) can be fitted to the cathode (3). For example, a method can be adopted wherein at least part of the metal frame (7) of the coil cushion (4) comprised of a metal coil (8) wound around the metal frame (7) is welded to the electrically conductive plate (2) and the cushion (3).

As the cathode (3) used in the present invention, hydrogen-generating cathodes are well known which generate hydrogen upon electrolysis when used for electrolyzing sodium chloride. The cathode (3) is usually used in the form of an active cathode which is comprised of a nickel substrate having supported thereon a hydrogen-generating electrode catalyst. At present various active cathodes have been developed and practically used. These active cathodes can be used in the present invention. For example, see JP 2005-330575 A.

As a metal substrate of cathode (3), an expanded metal electrode comprised of nickel strands is conventionally used, a typical example of which has the following dimensions. Strand width (width of cut): about 2 mm, short way (SW): about 6 mm, long way (LW): about 15 mm, and strand thickness (plate thickness): about 2 mm. When such expanded metal electrode made of nickel is used as a metal substrate of cathode, when the cathode (3) is brought into contact with an ion exchange membrane (5), the ion exchange membrane (5) tends to be damaged often and to a great extent. This is due to the fact that the mesh part of the cathode has high rigidity and gives an undesirably large pressure to part of the ion exchange membrane.

Therefore, it is preferable to use a metal substrate of the cathode (3) made of an expanded metal mesh having a width (width of cut) in the range of 0.1 mm to 1 mm, and a strand thickness (metal plate thickness) in the range of 0.1 mm to 1.0 mm, with a short way (SW) in the range of 0.5 mm to 5.0 mm, a long way (LW) in the range of 1.0 mm to 10 mm, and a percent open area in the range of 48% to 60%. In the case when the cathode (3) made of such expanded metal having supported thereon an electrode catalyst is used, when the cathode (3) is brought into contact with an ion exchange membrane (5), the ion exchange membrane (5) is damaged only to a negligible extent and very few times. This is due to the fact that the mesh part of the cathode has reduced rigidity and gives a small pressure to the ion exchange membrane.

The expanded metal grating electrode used in the present invention has meshes each having an open area approximated by the formula:

Open area of each mesh=(short way×long way)÷2

In the case when the short way and long way are of the above-mentioned sizes, the open area is in the range of 0.25 to 25 mm².

When open area of each mesh is too small, gas generated from the cathode becomes difficult to pass through the meshes of the expanded metal electrode. Thus too small open area of mesh is not preferable. In contrast, when open area of each mesh is too large, the tenacity of the cathode becomes poor. Preferably each open area is in the range of 1.0 to 10 mm².

If the percent open area of the expanded metal grating electrode is too small, gas generated from the cathode becomes difficult to pass through the meshes. Thus too small open area is not preferable. In contrast, the percent open area of the expanded metal electrode is too large, the tenacity of the cathode becomes poor. Preferably the percent open area is in the range of 48 to 60%.

In the ion exchange membrane method electrolytic cell, the coil cushion (4) is arranged on the electrically conductive plate (2) and further the cathode (3) is placed on the coil cushion (4). The manner in which the coil cushion (4), electrically conductive plate (2) and the cathode (3) are arranged is not particularly limited, provided that the cathode (3) is fitted to the electrically conductive plate (2) via the coil cushion (4). For example, the electrically conductive plate (2) and the frame of the coil cushion (4) are welded together, and the coil cushion (4) and the cathode (3) are electrically connected merely by placing the coil cushion (4) in contact with the cathode (3).

As illustrated in FIG. 1, an anode (6) is located at opposite side of the cathode (3) via the ion exchange membrane (5). Thus, the anode (6) is arranged so as to be in contact with an ion exchange membrane (5) of the adjacent electrolytic cell (not shown).

By the contact of the anode (6) with the ion exchange membrane (5) of the adjacent electrolytic cell, a desired predetermined pressure can be applied from the coil cushion (4) to the ion exchange membrane (5) via the cathode (3). For this purpose, the coil cushion (4) preferably has an impact resilience adjusted in the range of 7 to 17 kPa as average contact pressure. The impact resilience of the coil cushion (4) can be adjusted by the coil thickness. More specifically, the relationship of the impact resilience with the coil thickness of the coil cushion (4) is determined beforehand. When the ion exchange membrane method electrolytic cell of the present invention is assembled, the coil thickness can be adjusted so as to obtain the desired impact resilience. The procedure for adjusting the coil thickness is not particularly limited. The coil thickness can easily be adjusted by, for example, varying the thickness of a gasket.

By adjusting the impact resilience of the coil cushion (4) to 7 kPa or greater as average contact pressure, the distances between the ion exchange membrane (5) and the cathode (3) and/or the anode (6) can be controlled to the desired extent and the voltage of the electrolytic cell cab be reduced.

By arranging the coil cushion (4) between the electrically conductive plate (2) and the cathode (3), consumed electrical energy can be reduced. Simultaneously therewith, when the impact resilience of the coil cushion (4) is adjusted in the range of 7 to 17 kPa as average contact pressure, so as to apply a desired predetermined pressure from the coil cushion (4) to the ion exchange membrane (5) via the cathode (3), the contact pressure of the cathode (3) to the ion exchange membrane (5) becomes more uniform and the damage of the ion exchange membrane (5) caused by excessive contact pressure can be avoided.

As illustrated in FIG. 1, by using the electrical conductive plate (2) made of a non-perforated plate, gas generated from the cathode (3) forms a stream violently rising along the coil cushion (4). The stream of gas is accompanied by an electrolyte, therefore, the electrolyte also violently rises. Simultaneously the electrolyte forms a stream violently flowing down between the non-perforated electrically conductive plate (2) and the partition (1). Consequently supply of electrolyte to the ion exchange membrane (5) is enhanced, and the concentration of the liquid electrolyte is not reduced, and elevation of electrolysis voltage with time and reduction of current efficiency with time can be minimized.

The anode (6) is not particularly limited, and a conventional anode can be appropriately used. For example, a chlorine-generating electrode is widely known as the anode, which is comprised of an expanded metal substrate made of titanium and having supported thereon a chlorine-generating electrode catalyst such as iridium oxide and/or ruthenium oxide.

The ion exchange membrane (5) is not particularly limited, and conventional ion exchange membrane (5) can be appropriately used. For example, an ion exchange membrane comprised of a fluoro-resin film having a cation-exchange group such as a sulfonic acid group or carboxylic acid group is widely known.

EXAMPLES

The invention will now be described specifically by the following examples that by no means limit the scope of the invention.

Example 1

An ion exchange membrane method electrolytic cell having a structure as illustrated in FIG. 1 was assembled, wherein a coil cushion (4) was arranged between a non-perforated electrically conductive plate (2) and a cathode (3).

The coil cushion (4) used was made as follows. A metal frame (7) having a structure as illustrated in FIG. 5 was made from a nickel wire rod having a diameter of 1.2 mm. A metal coil having a coil diameter of 8.5 mm and comprised of a nickel wire having a diameter of 0.1 mm was made by a roll press. The metal coil (8) was wound around the metal frame (7) as illustrated in FIG. 6 at a winding number of 60 times per $dm^2$. A coil cushion (4) was made from the metal coil (8) wound around the metal frame (7) as illustrated in FIG. 7. The coil cushion (4) was arranged between the non-perforated electrically conductive plate (2) and the cathode (3) as illustrated in FIG. 1.

The coil cushion (4) had a coil density of 3.0 $g/dm^2$, and a coil thickness of 2.5 mm as measured after compression.

The cathode (3) was made as follows. A fine-mesh expanded metal substrate made of nickel having a length of 1400 mm in the short way direction and a length of 390 mm in the long way direction was prepared. The expanded metal substrate was comprised of nickel strands having a strand width (width of cut) of 0.2 mm, a strand thickness (metal plate thickness) of 0.2 mm, and had a short way of 1.0 mm, a long way of 2.0 mm, and a percent open area of 51%. The expanded metal substrate was subjected to etching using an aqueous hydrochloric solution with a 10 weight % concentration at a temperature of 50° C. for 15 minutes. The etched substrate was washed with water and then dried.

A coating liquid was prepared from a dinitrodiammine platinum $HNO_3$ solution (available from Tanaka kikinzoku kogyou K.K.; platinum concentration 4.5% by weight, solvent: 8 weight % $HNO_3$ solution), nickel nitrate 6 hydrate and water. The coating liquid had a platinum content of 0.5 as mol ratio and the total content of platinum and nickel in the mixed liquid was 5% by weight as metal weight.

The whole surface of the above-mentioned fine-mesh expanded metal substrate was coated with the coating liquid by using a brush. The liquid coating on the fine-mesh expanded metal substrate was dried at 80° C. for 15 minutes in a hot air drier, and then subjected to thermal decomposition at 500° C. for 15 minutes under an air stream in a box-type electric furnace. These procedures of coating, drying and thermal decomposition were repeated 5 times. Thus-prepared electrode coated with a platinum-nickel catalyst was used as the cathode (3) in the zero gap-type ion exchange membrane method electrolytic cell of the present invention.

The electrically conductive plate (2) was comprised of a non-perforated nickel plate.

The thickness of the coil cushion (4) was adjusted to 2.5 mm and set under conditions such that the impact resilience of the coil cushion (4) was 9.8 kPa.

An electrode DSE (registered trademark) available from Permelec Electrode Ltd. was used as the anode (6). An ion exchange membrane "Flemion" (registered trademark) available from Asahi Glass Co., Ltd. was used as the ion exchange membrane (5).

Figure 8:
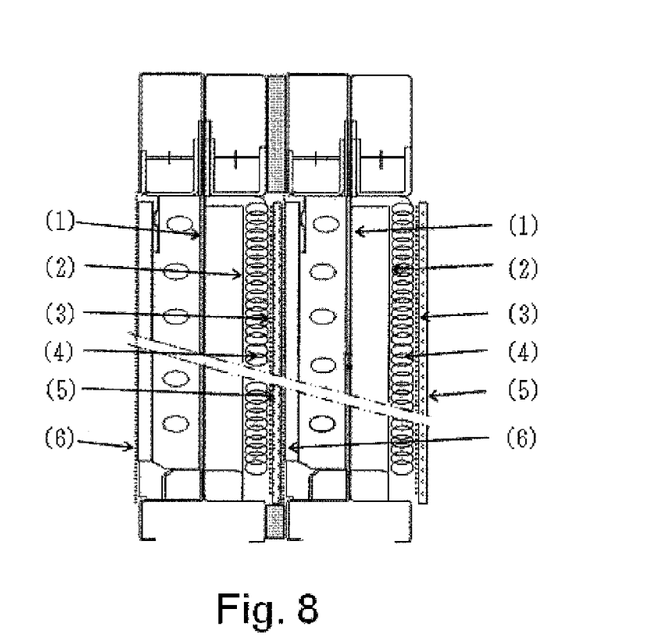
FIG. 8 is a view illustrating an assembly of ion exchanged membrane method electrolytic cells of the present invention.

Ion exchange membrane method electrolytic cell units were assembled to a zero gap-type ion exchange membrane method electrolytic cell apparatus as illustrated in FIG. 8 using the anode (6), the ion exchange membrane (5), the non-perforated electrically conductive plate (2), cathode (3), the coil cushion (4). The ion exchange membrane was placed in contact with the anode surface under conditions such that the pressure in a cathode chamber was set at 5 kPa higher than that in an anode chamber.

Electrolysis of sodium chloride was conducted under the following conditions. Current density: 5 $kA/m^2$, concentration of aqueous sodium chloride solution at outlet of the anode chamber: 200-210 g/L, concentration of aqueous sodium hydroxide solution at outlet of the cathode chamber: 31-33 weight %, temperature: 90° C. The electrolysis voltage was measured. The electrolysis voltage reached 3.0 V in the initial stage, and thereafter rose only to a very slight extent over a period of two years. The current density was maintained at 97% or more.

Example 2

By the same procedures and conditions as mentioned in Example 1, an ion exchange membrane method electrolytic cell apparatus having the same structure as mentioned in Example 1 was assembled and electrolysis of sodium chloride was conducted. An electrode coated with a platinum-nickel catalyst used as the cathode was prepared from an expanded metal substrate made of nickel having a length of 1400 mm in the short way direction and a length of 1200 mm in the long way direction. The expanded metal substrate was comprised of nickel strands having a strand width (width of cut) of 1.0 mm, a strand thickness (metal plate thickness) of 1.0 mm, and had a short way of 4.0 mm, a long way of 8.0 mm, and a percent open area of 46%. Other procedures and conditions remained the same.

The electrolysis voltage was measured. The electrolysis voltage was maintained at approximately 3.05 V, thus, 0.05 V higher than that as measured in Example 1.

Comparative Example 1

By the same procedures and conditions as mentioned in Example 1, an ion exchange membrane method electrolytic cell apparatus having the same structure as mentioned in Example 1 was assembled and electrolysis of sodium chloride was conducted. As a cushion, leaf springs having the same structure as illustrated in FIG. 4 of JP 2007-321229 A, each having a thickness of 0.2 mm, a width of 4 mm and a length of 35 mm, were used instead of the coil cushion (4). Other procedures and conditions remained the same.

The electrolysis voltage was measured. The electrolysis voltage was maintained at approximately 3.1 V, thus, 0.1 V higher than that as measured in Example 1.

Comparative Example 2

By the same procedures and conditions as mentioned in Example 1, an ion exchange membrane method electrolytic cell apparatus having the same structure as mentioned in Example 1 was assembled and electrolysis of sodium chloride was conducted. The cell structure of the electrolytic cell apparatus is illustrated in FIG. 2. As an electrically conductive plate, a perforated nickel plate (9) (FIG. 2) having a thickness of 1.0 mm, a long way of 8.0 mm, a short way of 4.0 mm, a length of cut of 1.0 mm and a percent open area of 46% was used instead of the non-perforated electrical conductive plate (2). Other procedures and conditions remained the same.

The electrolysis voltage was measured. The electrolysis voltage reached 3.0 V in the initial stage (which was similar in Example 1), but gradually rose with lapse of time, and reached 3.1 V one year later.

It is presumed that the above-mentioned elevation of the electrolysis voltage occurred due to the following facts. Hydrogen gas generated from the cathode (3) passes through the openings of the perforated electrically conductive plate (2) to the backside thereof. Thus, violently rising stream of gas flowing along the coil cushion (4) and the accompanying violently rising stream of liquid electrolyte are not formed. A downward stream of electrolyte is also not formed between the electrically conductive plate (2) and the partition (1). Consequently supply of liquid electrolyte to the ion exchange membrane is insufficient, and the concentration of the liquid electrolyte is reduced, and elevation of voltage with time and reduction of current efficiency with time occurred to a considerable extent.

Comparative Example 3

The procedures mentioned in Example 1 were repeated to assemble an ion exchange membrane method electrolytic cell apparatus, wherein the coil cushion (4) was arranged so that the axial direction thereof is in agreement with the transverse (horizontal) direction of the electrolytic cell apparatus. A top plan view of the ion exchanged membrane method electrolytic cell is shown in FIG. 4. Other procedures and conditions remained the same.

Electrolysis of sodium chloride was conducted, and the electrolysis voltage was measured. The electrolysis voltage was maintained at approximately 3.1 V, thus, 0.1 V higher than that as measured in Example 1.

INDUSTRIAL APPLICABILITY

The ion exchange membrane method electrolytic cell of the present invention exhibits an enhanced energy-saving effect as compared with the conventional zero gap-type electrolytic cell Thus, energy required for electrolysis can be can be maintained stably at a low level over a long period of time. Further damage of the ion exchange membrane can be avoided over a long period of time.

Therefore the ion exchange membrane method electrolytic cell of the present invention can be used in electrolysis industry typically including electrolysis of alkali chloride such as sodium chloride. Further, the electrolytic cell can also be used advantageously in other electrolysis such as electrolysis of aqueous potassium chloride solution and aqueous alkaline solution.

The invention claimed is:

1. An electrolytic cell comprising a coil cushion arranged between an electrically conductive plate and a cathode for hydrogen gas evolution, which are accommodated in a cathode gas-liquid chamber, and further comprising an ion-exchange membrane in direct contact with which the cathode for hydrogen gas evolution is arranged, wherein the electrically conductive plate is made of a non-perforated plate, and the coil cushion is arranged so that an axial direction thereof is in agreement with a vertical direction of electrolytic cell, wherein the electrolytic cell further comprises a partition on the opposite side of the electrically conductive plate from the cathode, and the electrically conductive plate is spaced apart from the partition at a distance.

2. The electrolytic cell according to claim 1, wherein the coil cushion is comprised of a metal coil wound around a metal frame, and has an impact resilience adjusted in the range of 7 to 17 kPa as average contact pressure.

3. The electrolytic cell according to claim 2, wherein the metal coil is wound around the metal frame at a winding number in the range of 3 to 9 times per cm.

4. The electrolytic cell according to claim 1, wherein the cathode is made of an expanded metal with strands in the form of a mesh, wherein the strands have a width in the range of 0.1 mm to 1.0 mm, and having a short way in the range of 0.5 mm to 5.0 mm and a long way in the range of 1.0 mm to 10 mm, and with a strand thickness in the range of 0.1 mm to 1.0 mm, and a percent open area in the range of 48% to 60%, and said expanded metal having supported thereon an electrode catalyst.

5. The electrolytic cell according to claim 4, wherein the mesh in the expanded metal has an open area in the range of 1.0 mm2 to 10 mm2.

* * * * *